May 19, 1959  C. T. COX  2,886,882
FRICTION COMPOSITION PRODUCT
Filed June 6, 1956

INVENTOR.
C. THOMAS COX
BY Richard H. MacCutcheon
His Attorney

United States Patent Office 2,886,882
Patented May 19, 1959

2,886,882

FRICTION COMPOSITION PRODUCT

Cecil Thomas Cox, Pepper Pike, Ohio, assignor to The S. K. Wellman Co., Bedford, Ohio, a corporation of Ohio Application June 6, 1956, Serial No. 589,640

1 Claim. (Cl. 29—182.5)

This invention relates to improvements in friction material for vehicular and industrial use and has particular significance in connection with pressed and sintered predominantly metallic material useful as brake, clutch, or transmission friction facings adapted to engage relatively movable metallic elements.

Friction materials used for linings or facings in brakes, clutches, automatic transmissions and the like, must be selected and compounded with many factors in mind if customer acceptance and satisfactory operation are to be assured. These factors include high coefficient of friction, low wear of the lining and the surface which it engages, absence of "fading" (decrease of coefficient of friction, for example, due to a rapid succession of high speed engagements or due to the presence of oil, grease, moisture, etc.), quietness of operation of the material, freedom from "grabbing" and erratic operation, and relatively low cost of the materials and of their compounding.

Particularly for road vehicle clutch and brake applications, there has been a long search for a satisfactory friction material. Various formulations for predominantly metallic friction facings made from powders have been used for many years, particularly in heavy duty applications such as in trucks, buses, military vehicles, airplanes, and industrial machinery, but the facings known heretofore have not met all of the rigid requirements for a satisfactory friction material for many applications.

It is an object of the present invention to provide a novel friction material which satisfies these long known requirements.

Other objects and advantages will become apparent and the invention may be better understood from consideration of the following description and the accompanying drawing, in which.

Typical of sintered predominantly metallic friction facings as heretofore known and used is that referred to in U.S. Patent No. 2,607,245, issued August 19, 1952, on an application filed by Samuel K. Wellman and which contains four metallic powders (copper, tin, lead, and iron) and two nonmetallic powders (silica and graphite). In that mix copper was used as the basic metal because of its heat conducting properties and its resistance to oxidation. Tin was included to add strength to the metallic matrix by substantially alloying with the copper during sintering. Iron was used to give the finished material a high coefficient of friction, and lead, a metallic lubricant, to prevent jerking or grabbing in operation. The silica was included for its abrasive, friction producing qualities, and the graphite was added as a lubricant to provide a smooth rubbing action. According to the art all of these materials are powdered, then mixed in certain proportions, and then pressed, and sintered.

By contrast I have found that a greatly improved friction composition product may be made by using a pressed and sintered simple three component mix comprising: powdered copper as a base together with powdered graphite and powdered cast iron grit.

The copper is substantially pure (preferably) and it may be powdered to the extent of 90 percent through 200 mesh. The carbon may be in the form of artificial graphite of particle size averaging 90 percent through 325 mesh. The cast iron grit is a known material, a hard white iron with about 2.5 percent carbon, cast and chilled and as previously used, for example, in shot blasting. For the present application it may be ground to pass predominantly through 150 mesh. The powdered ingredients may be measured out by weight, then mixed in a blender, then molded, e.g., at 11½ tons per square inch pressure, and then sintered at, say, from 1400 to 1800° F., while under a pressure of 200 pounds per square inch.

Desirable proportions of the three materials are (by weight) as follows:

|  | Percent |
|---|---|
| Cu | 70 |
| C | 20 |
| Fe grit | 10 |

Many times in nature there are no finite discontinuities and it is difficult if not impossible to set limits for desirable ranges for the above particularly since, as will be appreciated by those in the art, exact percentages depend upon particle size and shape (of each of the ingredients), density (of each of the ingredients), pressures used, sintering temperatures, ultimate application of the end product particularly with respect to engagement pressure, cooling if any, size, shape and composition of mating surface, size and shape of friction material, and other factors.

Figure 1:
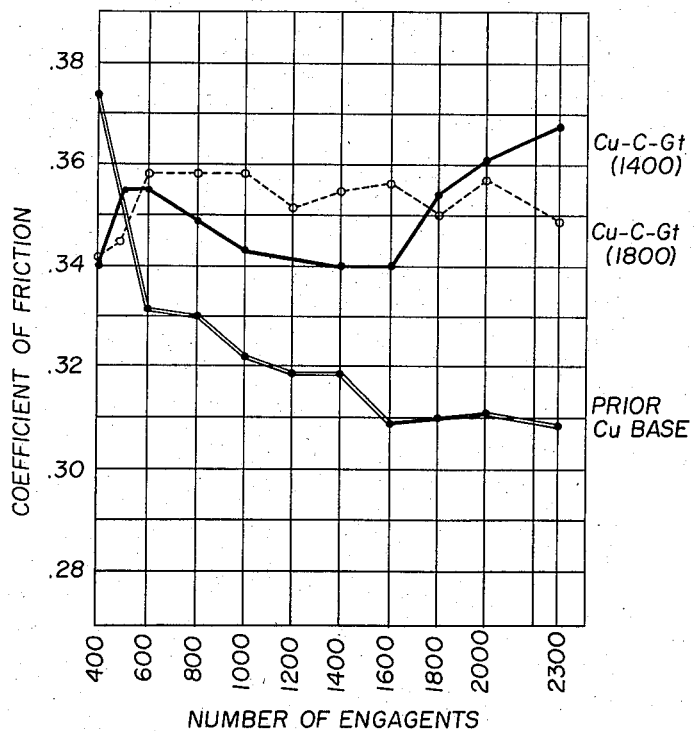
Fig. 1 shows a chart of curves based on dynamometer test results of clutch performance and indicating the frictional characteristic of three sintered materials, two of them according to the invention, and the third according to prior art.

Advantages may be understood by reference to Fig. 1 which is a chart of curves based on dynamometer tests showing coefficient of friction as against number of engagements with a specific construction using what may be though of as three different facing compositions (although actually many more were tested). As marked, one of the curves shows performance using a "Prior Cu Base" composition which represented the best of the copper base mixes previously known and which was substantially the same as the one referred to in the above mentioned patent with minor deviations, as follows:

|  | Pat. 2,607,245 | | Prior Cu Base (of Figs. 1 and 2) As Compounded |
|---|---|---|---|
|  | As Compounded | Per Chem. Analysis |  |
| Cu | 68.1 | 67.26 | 71 |
| Sn | 5.4 | 5.31 | 5 |
| Pb | 8.7 | 8.72 | 1 |
| Fe | 7.4 | 7.21 | 8.5 |
| MoS₂ | | | 5 |
| C | 6 | 7.08 | 4.5 |
| SiO₂ | 4.4 | 4.42 | 5 |

The other curves of Fig. 1 show performance using a 70 percent Cu, 20 percent C, 10 percent Grit formulation according to the present invention with, as marked, in one case the sintering temperature being 1800° F., and in the other case the sintering temperature being 1400° F., as indicated by the drawing legends "(1400)" and "(1800)" respectively.

The tests leading to the plotted curves were made on a dynamometer employing dry clutch standard operating conditions on a Twin Disc clutch assembly. Inertia-type testing procedure was used with a clutch rubbing speed of 1200 r.p.m. and an energy absorption of 18,050 ft. lbs. with a stop every 20 seconds. An air diaphragm pressure of 38.0 p.s.i. was used to produce an equivalent clutch loading of 1200 lbs.

The tests were run with the materials against cast iron opposing surfaces, and the results of duplicate identical tests were averaged to give the plotted values.

Since for each curve the test conditions were the same (except for friction material), it is apparent from Figure 1 that the "Prior Copper Base" composition was characterized by a reltaively low coefficient of friction and a large fade or decrease in coefficient of friction due to rising temperature with repetitive engagements, whereas the "Cu-C-Gt" material (sintered at either 1400 or 1800° F.) was characterized by a generally higher coefficient of friction and by substantially no fade.

Figure 2:
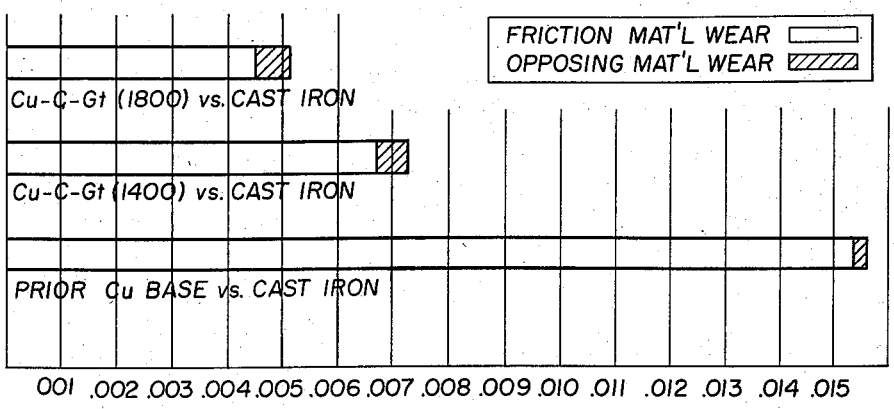
Fig. 2 shows a graphical representation for a comparison of average total wear during the same tests. In the tests the three materials were run each against the same cast iron opposing material.

Not only did the tests made permit of the usual measurements to provide dynamic coefficient of friction values as plotted (in Fig. 1), and static coefficient of friction values as well, but the various friction material samples (and also the opposing surface samples) were measured before and after each test to establish, in each case by subtracting final from initial thicknesss measurement, wear of the materials as shown by the graphs of Fig. 2 in which, for each of the same three compositions, friction material wear is shown by a white block according to thousandths of an inch wear and cast iron opposing material wear is indicated by a cross hatched block.

From all of the above taken together, it will be apparent to those skilled in the art that I have provided a composition having all the advantages of a copper base (e.g., for good heat conductivity) but having improved characteristics so far as coefficient of friction, fade and wear are concerned.

For each mix the observed (and plotted) values were averaged out (for all stops) and it was found that the average dynamic coefficient of friction of the two Cu-C-Gt mixes were nearly the same and that each represents a substantially higher average coefficient of friction than the Prior Cu Base mix, and, also of great importance, each has a more level, less fluctuating coefficient of friction for successive engagements than that for the Prior Cu Base, and thus less "fade." Further, so far as fade is concerned, it was seen that of the two Cu-C-Gt compositions the one sintered at 1800 has the least fade (i.e., the greater stability) possibly because of more complete sintering. At least further tests indicated that the 1800 material had a surface hardness slightly lower than that of the 1400 material (19.0 as compared to 25.5 in the R/15z scale) and this probably also had an effect in wear as illustrated in Fig. 2 where it is seen that the wear was least with the 1800 material. Thus it is seen that the 1800 material was superior as to (1) higher coefficient of friction, (2) lesser fade, and (3) lesser wear.

For each material it was found that not only was the average dynamic coefficient of friction for the 1800 mix higher than that for the 1400 mix, but the average hot static coefficient of friction was 5.4 percent higher for the 1800 mix than for the 1400 mix and the average hot static coefficients of friction of both these materials were found to be quite preferable to that of the best prior copper base material known. While the wear of opposing surface was slightly higher when using the new materials of the invention, the wear of the new composition (compared to the prior copper base) was so much less as to more than compensate for the slight additional wear on the opposing surface (see Fig. 2).

Coefficient of friction, fade, and wear are not the only criteria for friction materials. Low noise, freedom from erratic operation and low cost are also important, but from the standpoint of all observable qualities the new Cu-C-Gt mix of the invention was found as good as or better than all known prior copper base mixes, and as to cost concerned it was found superior to them.

So far as the customer is concerned he is paying only for an article of certain dimensions and, in general, the lower the density of a friction material the lower can be the selling cost because the producer of such material is buying his raw materials by the pound. There are also other advantages of low density material. For example, low inertia of the final part often assumes great importance, as when the friction material is on a member rapidly accelerated and decelerated as in an automatic transmission.

With respect to density and cost, material composition according to the invention compares favorably with prior known materials, as follows:

|  | Pressed Density (in gm./cc.) | Raw Material Cost (in $/in.³) |
|---|---|---|
| Cu-C-Gt Mix | 4.0 | .069 |
| Prior Cu base mix of Figs. 1 and 2 | 4.5 | .096 |
| Prior Mix of Pat. 2,607,245 | 5.3 | .094 |

It will be seen that cost does not vary exactly with density, because relative costs of different raw materials enter in. But when there is an absence of more expensive materials, such as lead and tin, and at the same time a lower density, as is the case with the Cu-C-Gt composition of the present invention, the cost savings become quite consequential.

While I have illustrated and described particular embodiments, various modifications may obviously be made without departing from the true spirit and the scope of the invention intended to be defined in the appended claim.

What is claimed is:

Pressed and sintered brake and clutch facting material characterized by high coefficient of friction, low fade and long wear and comprising substantially 70% by weight of copper, 20% by weight of graphite, and 10% by weight of cast iron grit.

References Cited in the file of this patent

UNITED STATES PATENTS

| 2,072,070 | Fisher | Feb. 23, 1937 |
| 2,229,330 | Langhammer et al. | Jan. 21, 1941 |
| 2,239,134 | Wellman | Apr. 22, 1941 |
| 2,408,430 | Lowey et al. | Oct. 1, 1946 |
| 2,301,805 | Harder | Nov. 10, 1952 |
| 2,686,140 | Goougue | Aug. 10, 1954 |